(12) United States Patent \
Li et al.

(10) Patent No.: US 12,673,612 B2 \
(45) Date of Patent: Jul. 7, 2026

(54) FRAMELESS AUTO-DIMMING REAR VIEW MIRROR AND ITS PRODUCTION METHOD

(71) Applicant: SUZHOU TSUWAY SMART TECHNOLOGIES CO., LTD, Suzhou (CN)

(72) Inventors: Guowen Li, Suzhou (CN); Yangguang Zhao, Suzhou (CN); Jiuzhi Xue, Suzhou (CN); Haifeng Li, Suzhou (CN)

(73) Assignee: SUZHOU TSUWAY SMART TECHNOLOGIES CO., LTD, Suzhou (CN)

( * ) Notice: Subject to any disclaimer, the term of this patent is extended or adjusted under 35 U.S.C. 154(b) by 645 days.

(21) Appl. No.: 18/020,738

(22) PCT Filed: Jul. 28, 2021

(86) PCT No.: PCT/CN2021/108937 \
§ 371 (c)(1), \
(2) Date: Feb. 10, 2023

(87) PCT Pub. No.: WO2022/033309 \
PCT Pub. Date: Feb. 17, 2022

(65) Prior Publication Data \
US 2023/0294605 A1      Sep. 21, 2023

(30) Foreign Application Priority Data

Aug. 11, 2020    (CN) ........................ 202010802263.X

(51) Int. Cl. \
B60R 1/08          (2006.01) \
B60R 1/04          (2006.01) \
          (Continued)

(52) U.S. Cl. \
CPC ................ B60R 1/088 (2013.01); B60R 1/04 (2013.01); G02F 1/133531 (2021.01); \
          (Continued)

(58) Field of Classification Search \
CPC ........... B60R 1/088; B60R 2001/1223; B60R 2001/1253; B60R 1/04; B60R 1/12; G02F 1/133536; G02F 1/1345; G02F 1/13452 \
See application file for complete search history.

(56) References Cited

U.S. PATENT DOCUMENTS

2019/0351827 A1* 11/2019 Xue .................... G02F 1/13318

FOREIGN PATENT DOCUMENTS

CN          101738777 A  *  6/2010 \
CN          107247360 A  *  10/2017  ....... G02F 1/133512 \
          (Continued)

*Primary Examiner* — Jia X Pan \
(74) *Attorney, Agent, or Firm* — Oliff PLC

(57)          ABSTRACT

A frameless auto-dimming rear view mirror, including an absorptive-type polarizing layer, a liquid crystal dimming layer and a reflective-type polarizing. The liquid crystal dimming layer includes a first transparent substrate, a first transparent electrode, a first alignment layer, a liquid crystal layer, a second alignment layer, a second transparent electrode and a second transparent substrate arranged in sequence. The first transparent substrate is adjacent to the absorptive-type polarizing layer, and its position corresponds to the position of the second transparent substrate, and the first transparent substrate is provided with a step which is beyond the position of the second transparent substrate at its edge. The frameless auto-dimming rear view mirror also includes an electrode connecting line electrically connected with the first transparent electrode and the second transparent electrode respectively, and is located at the step and fixed on the side of the first transparent substrate facing the second transparent substrate.

15 Claims, 4 Drawing Sheets

10

(51) Int. Cl.
    *B60R 1/12*           (2006.01)
    *G02F 1/1335*      (2006.01)
    *G02F 1/1345*      (2006.01)

(52) U.S. Cl.
    CPC ...... *G02F 1/133536* (2013.01); *G02F 1/1345*
        (2013.01); *G02F 1/13452* (2013.01); *B60R*
        *1/12* (2013.01); *B60R 2001/1223* (2013.01);
        *B60R 2001/1253* (2013.01); *B60R 2001/1276*
        (2013.01)

(56) References Cited

FOREIGN PATENT DOCUMENTS

| | | | | | |
|---|---|---|---|---|---|
| CN | 206696910 U | * | 12/2017 | | |
| CN | 210337743 U | * | 4/2020 | | |
| JP | 2012209407 A | * | 10/2012 | | |
| KR | 20120074499 A | * | 7/2012 | ............ | G02F 1/133 |

\* cited by examiner

FRAMELESS AUTO-DIMMING REAR VIEW MIRROR AND ITS PRODUCTION METHOD

This application claims the priority of the invention patent application with the application date of Aug. 11, 2020, the application number of CN202010802263.X, and the invention name of "a frameless auto-dimming rear view mirror and its production method", and all its contents are incorporated in this application by reference.

TECHNICAL FIELD

The invention relates to the technical field of auto parts, in particular to a frameless auto-dimming rear view mirror and its production method.

BACKGROUND OF INVENTION

At present, the traditional automobile interior rear view mirror not only has the single function, but also has severely limited rear view. Therefore, the streaming media rear view mirror with display screen has gradually become popular in recent years. In brief, the streaming media rear view mirror captures the traffic information behind the vehicle through the rear view camera installed at the rear of the vehicle, and transmits it to the display screen in the interior rear view mirror in real time, so the driver and passenger can know the traffic information behind the vehicle by watching the display screen. Compared with the traditional specular rear view mirror, the streaming media rear view mirror can provide a wider view, especially in rainy and foggy weather.

Although the streaming media rear view mirror has developed rapidly in recent years, with a wide variety of related products, there are still many problems that affect the safety and sense of experience to be solved, such as ghosting, low display brightness, serious heating, high cost, complex installation, low adaptability, lack of automatic dimming function or slow dimming speed, and complex operation. On the other hand, most of the current streaming media rear view mirrors are provided with frames, so that the peripheries are blocked, which reduces the visual area of the rear view mirror and also affects the aesthetics.

DISCLOSURE OF THE INVENTION

The purpose of the invention is to propose a frameless auto-dimming rear view mirror and its production method in view of the above technical problems in the prior art.

The invention adopts the following technical scheme:

A frameless auto-dimming rear view mirror, comprises an absorptive-type polarizing layer, a liquid crystal dimming layer and a reflective-type polarizing layer arranged in sequence from the side of the observer, and the liquid crystal dimming layer comprises a first transparent substrate, a first transparent electrode, a first alignment layer, a liquid crystal layer, a second alignment layer, a second transparent electrode and a second transparent substrate arranged in sequence, and the first transparent substrate is adjacent to the absorptive-type polarizing layer, and the position of the first transparent substrate corresponds to the position of the second transparent substrate, and the first transparent substrate is provided with a step which is beyond the position of the second transparent substrate at its edge, and the frameless auto-dimming rear view mirror also comprises an electrode connecting line electrically connected with the first transparent electrode and the second transparent electrode respectively, and the electrode connecting line is located at the step and fixed on the side of the first transparent substrate facing the second transparent substrate.

Preferably, it also comprises an ink layer located on the side of the absorptive-type polarizing layer diverging from the first transparent substrate.

Preferably, the ink in the ink layer is screen printing ink or metallic printing ink, and the width of the ink layer is in the range of 1.0 mm-10 mm.

Preferably, the electrode connecting line is an FPC board.

Preferably, the FPC board comprises an inner area and an outer area connected to the inner area, and the inner area comprises a connecting finger area and a PAD area, and the connecting finger area comprises a first connecting finger area and a second connecting finger area, and the first connecting finger area is electrically connected to the first transparent electrode, and the second connecting finger area is electrically connected to the second transparent electrode, and the PAD area comprises a first PAD area and a second PAD area, and the first PAD area is electrically connected to the first connecting finger area, and the second PAD area is electrically connected to the second connecting finger area.

Preferably, the connection between the outer area and the inner area is provided with a cutting line, which is convenient for subsequent cutting and removal of the outer area, and the cutting line is flush with the edge of the first transparent substrate or located inside the edge of the first transparent substrate.

Preferably, the frameless auto-dimming rear view mirror also comprises at least a light sensor and a control unit, and the light sensor detects changes in ambient light and feeds information back to the control unit, which electronically adjusts the voltage applied to the liquid crystal layer according to the information.

Preferably, the light sensor comprises a front light sensor facing the front of the frameless auto-dimming rear view mirror and a rear light sensor facing the rear of the frameless auto-dimming rear view mirror.

Preferably, the frameless auto-dimming rear view mirror also comprises a front camera module, a front camera adapter cable, a rear camera module and a rear camera adapter cable, and the front camera module is connected with the control unit through the front camera adapter cable, and the rear camera module is connected with the control unit through the rear camera adapter cable.

Preferably, the frameless auto-dimming rear view mirror also comprises a display module located on one side of the reflective-type polarizing layer diverging from the liquid crystal dimming layer.

Preferably, the frameless auto-dimming rear view mirror also comprises a back hook and a strap opposite to the observer.

Preferably, the frameless auto-dimming rear view mirror also comprises a horn and a microphone, which are respectively used for sending and receiving sound signals.

On the other hand, the invention provides a production method of frameless auto-dimming rear view mirror, including the steps: a. To provide a liquid crystal dimming layer, and the liquid crystal dimming layer comprises a first transparent substrate, a first transparent electrode, a first alignment layer, a liquid crystal layer, a second alignment layer, a second transparent electrode and a second transparent substrate arranged in sequence, and the first transparent substrate is adjacent to the absorptive-type polarizing layer, and the position of the first transparent substrate corresponds to the position of the second transparent substrate, and the first transparent substrate is provided with a step which is beyond the position of the second transparent substrate at its edge; b. To form an electrode connecting line electrically connected with the first transparent electrode and the second transparent electrode respectively in the liquid crystal dimming layer and the binding device grabs the outer area of the electrode connecting line for alignment, and then hot press the inner area of the electrode connecting line so that the inner area of the electrode connecting line is located at the step and fixed on the side of the first transparent substrate facing the second transparent substrate; c. To cut and remove the outer area of the electrode connecting line; d. To provide an absorptive-type polarizing layer, and form an ink layer on one side of the absorptive-type polarizing layer, and then attach the side of the absorptive-type polarizing layer diverging from the ink layer to the liquid crystal dimming layer, or first attach the absorptive-type polarizing layer to the liquid crystal dimming layer, and then form an ink layer on the side of the absorptive-type polarizing layer diverging from the liquid crystal dimming layer; e. To attach the reflective-type polarizing layer to the other side of the liquid crystal dimming layer.

Preferably, the polarization direction of the absorption axis of the absorptive-type polarizing layer is parallel to or perpendicular to that of the reflection axis of the reflective-type polarizer.

Preferably, the connection between the outer area and the inner area is provided with a cutting line, which is convenient for subsequent cutting and removal of the outer area, and the cutting line is flush with the edge of the first transparent substrate or located inside the edge of the first transparent substrate.

Preferably, in the step b, the first transparent electrode is electrically connected directly with the electrode connecting line, and the second transparent electrode is electrically connected with the electrode connecting line through a conductive object arranged between the first transparent substrate and the second transparent substrate.

Preferably, the conductive object is conductive particles.

The frameless auto-dimming rear view mirror of the invention has the advantages of no ghosting, fast dimming speed and high utilization efficiency of the mirror surface; and the production method of the frameless auto-dimming rear view mirror of the invention is simple in technology and low in production cost.

BRIEF DESCRIPTION OF THE DRAWINGS

The invention can be better understood by referring to the illustration of the embodiment of the invention. In the figures.

SPECIFIC EMBODIMENT

In the following description, a large number of specific details are described in order to achieve the purpose of explanation and have a comprehensive understanding of the invention. However, it is obvious that the invention can be realized without such specific details for a person skilled in the field. The illustrative embodiments listed in the invention are for illustration only and do not limit the invention. Therefore, the scope of protection of the invention is not limited by the specific embodiment, but only subject to the scope of the appended claims.

Figure 1:
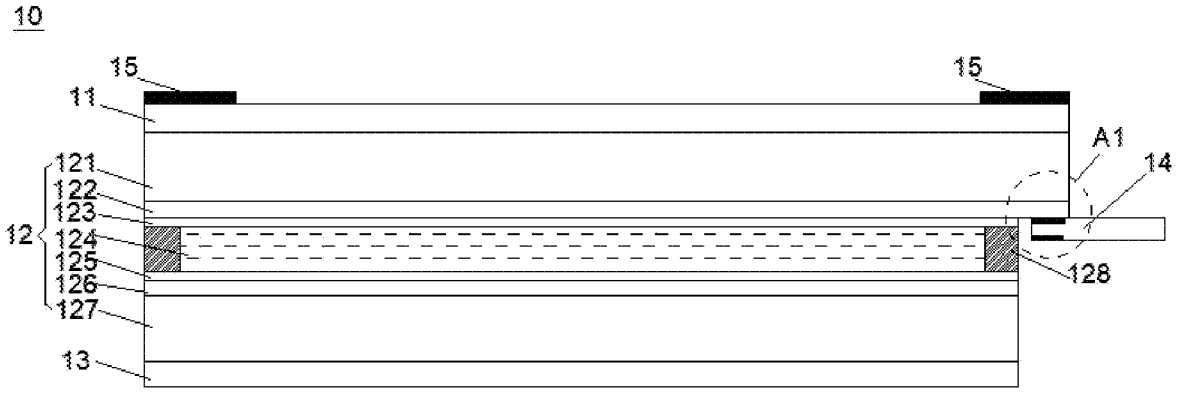
FIG. 1 is the section view of the frameless auto-dimming rear view mirror of the specific embodiment of the invention.

The frameless auto-dimming rear view mirror of the specific embodiments of the invention is described in detail below with reference to the figures. FIG. 1 is the section view of the frameless auto-dimming rear view mirror of the specific embodiment of the invention. As shown in FIG. 1, the frameless auto-dimming rear view mirror of the embodiment of the invention comprises an absorptive-type polarizing layer 11, a liquid crystal dimming layer 12 and a reflective-type polarizing layer 13 arranged in sequence from the side of the observer, and the liquid crystal dimming layer 12 comprises a first transparent substrate 121, a first transparent electrode 122, a first alignment layer 123, a liquid crystal layer 124, a second alignment layer 125, a second transparent electrode 126 and a second transparent substrate 127 arranged in sequence, and the first transparent substrate 121 is located on the observer side of the liquid crystal dimming layer 12, and the position of the first transparent substrate 121 corresponds to the position of the second transparent substrate 127, and the first transparent substrate 121 is provided with a step A1 which is beyond the position of the second transparent substrate 127 at its edge, and the frameless auto-dimming rear view mirror also comprises an electrode connecting line 14 electrically connected with the first transparent electrode 122 and the second transparent electrode 126 respectively, and the electrode connecting line 14 is located at the step A1 and fixed on the side of the first transparent substrate 121 facing the second transparent substrate 127. In the specific embodiment of the invention, the absorptive-type polarizing layer 11 absorbs the light with the same polarization direction of the absorption axis of the absorptive-type polarizing layer, and allows the light with the polarization direction perpendicular to the absorption axis of the absorptive-type polarizing layer to pass through, and the liquid crystal dimming layer 12 is arranged under the absorptive-type polarizing layer 11. The reflective polarizing layer 13 is arranged under the liquid crystal dimming layer 12 in essentially the same size as the liquid crystal dimming layer 12. The reflective polarizing layer 13 reflects light with the same polarization direction of the reflection axis of the reflective polarizing layer 13, and allows the light perpendicular to the polarization direction of the reflection axis of the reflective polarizing layer 13 to pass through, and the polarization direction of the absorption axis of the absorptive-type polarizing layer 11 and the polarization direction of the reflection axis of the reflective-type polarizer are parallel or perpendicular to each other, and the reflective-type polarizing layer 13 could be made from Advanced Polarizer Film (APF), Reflective Polarizing Mirror (RPM), Dual Brightness Enhancement Film (DBEF) or metal mesh reflective polarizing film, etc. In this embodiment, most of the areas of the first transparent substrate 121 and the second transparent substrate 127 corresponding to each other in the upper and lower positions are overlapped. Since the first transparent substrate 121 is provided with a step A1 which is beyond the position of the second transparent substrate 127 at its edge, that is, the first transparent substrate 121 is provided with a step A1 where the first transparent substrate 121 and the second transparent substrate 127 do not overlap, and the electrode connecting line 14 is fixed at the step A1 and the electrode connecting line 14 is fixed on the side of the first transparent substrate 121 facing the second transparent substrate 127. In this embodiment, the size of the first transparent substrate 121 is set to be larger than the size of the second transparent substrate 127, and the first transparent substrate 121 is provided with a step A1 at its edge, and the electrode connecting line 14 is set in the step to realize fast and effective line connection without affecting the use of this area used as an effective area of the auto-dimming surface; in addition, compared with the traditional line connection mode, this embodiment can effectively enhance the stability of line connection and reduce the line failure rate. Compared with other line connection methods such as folding the line back after line connection, the connection method in this embodiment has more reliable and stable performance. In addition, the overall space utilization rate of the frameless auto-dimming rear view mirror is enhanced while the overall appearance is improved, making the layout more reasonable and compact.

As shown in FIG. 1, in this embodiment, the frameless auto-dimming rear view mirror also comprises an ink layer 15 located on one side of the absorptive-type polarizing layer 11 diverging from the liquid crystal dimming layer 12. In this embodiment, as the liquid crystal dimming layer has frame glue 128 and the main function of the frame glue 128 is to prevent liquid crystal leakage, support and connect the first transparent substrate 121 and the second transparent substrate 127. However, if it's viewed from the front, the color of the area of frame glue 128 cannot be the same as the color of the effective display area of the liquid crystal dimming layer, and the shape of frame glue 128 is relatively irregular, so it will greatly affect the visual effect of the frameless auto-dimming rear view mirror. In the existing technology, in order to improve the visual effect, a layer of glass cover plate with silk screen is often added on the surface of the absorptive-type polarizing layer, but it will undoubtedly greatly increase the cost. In this embodiment, the ink is screen printed around the periphery of the absorptive-type polarizing layer 11, and the function of the ink layer is to cover the area occupied by the frame glue 128 around the liquid crystal dimming layer 12, so as to hide the frame glue area. In this embodiment, preferably, the ink in ink layer 15 is screen printing ink or metallic printing ink and the use of screen printing ink or metallic printing ink can make the area of the ink layer basically consistent with other areas without ink layer when the frameless auto-dimming rear view mirror in this embodiment is used as the mirror mode, and the effect of the ink layer after screen printing is preferably the silver mirror effect or other glossy metallic effect in order to achieve a similar color with other areas (other effective display area), so that the frameless auto-dimming rear view mirror can achieve the integrated effect, and will not affect the appearance due to the obvious traces of the ink layer contained around. In this embodiment, the width of the ink layer 15 is in the range of 1.0 mm-10 mm. However, the invention is not limited to this, the ink layer 15 can also be made from the traditional ink materials, without specific restrictions.

Figure 2:
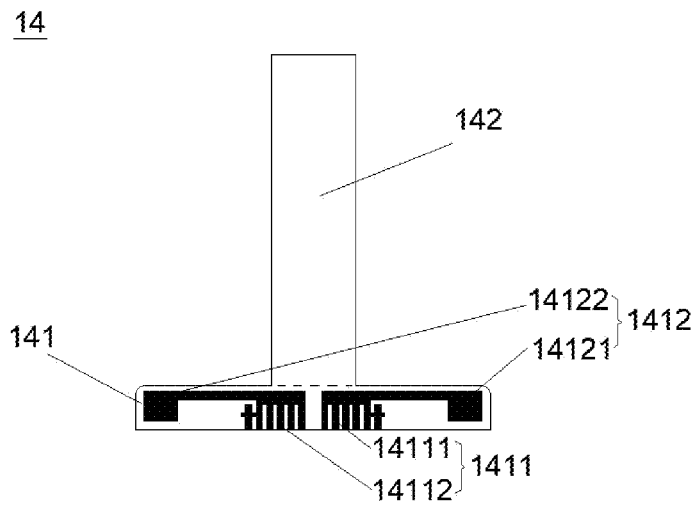
FIG. 2 is the schematic view of the electrode connecting line close to the side of the first transparent electrode in the frameless auto-dimming rear view mirror of the specific embodiment of the invention.
Figure 3:
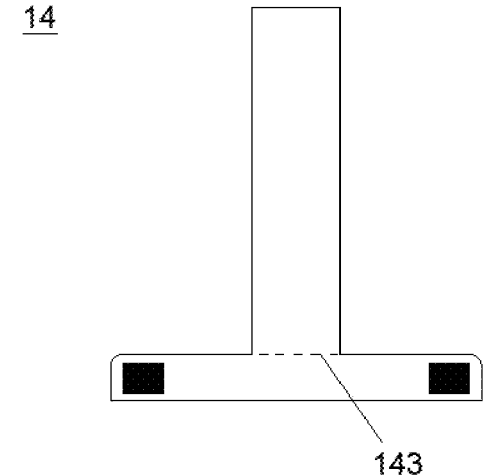
FIG. 3 is the schematic view of the electrode connecting line diverging from the side of the first transparent electrode in the frameless auto-dimming rear view mirror of the specific embodiment of the invention.

FIG. 2 is the schematic view of the electrode connecting line close to the side of the first transparent electrode in the frameless auto-dimming rear view mirror of the specific embodiment of the invention; and FIG. 3 is the schematic view of the electrode connecting line diverging from the side of the first transparent electrode in the frameless auto-dimming rear view mirror of the specific embodiment of the invention; as shown in FIGS. 2 and 3, in this embodiment, the electrode connecting line is an FPC board, and the FPC board 14 comprises an inner area 141 and an outer area 142 connected to the inner area 141. In this embodiment, the inner area 141 comprises a connecting finger area 1411 and a PAD area 1412, and the connecting finger area 1411 comprises a first connecting finger area 14111 and a second connecting finger area 14112, and the first connecting finger area 14111 is electrically connected to the first transparent electrode 122, and the second connecting finger area 14122 is electrically connected to the second transparent electrode 126, and the PAD area 1412 comprises a first PAD area 14121 and a second PAD area 14122, and the first PAD area 14121 is electrically connected to the first connecting finger area 14111, and the second PAD area 14122 is electrically connected to the second connecting finger area 14112. In this embodiment, the first transparent electrode 122 is directly electrically connected with FPC board 14. Specifically, the first transparent electrode 122 is directly electrically connected with the first connecting finger area 14111 on FPC board 14 and the first connecting finger area 14111 is electrically conductive to the first PAD area 14121 through the conductive layer of FPC board 14 itself (such as copper foil layer). In this embodiment, the second transparent electrode 126 is electrically connected to FPC board 14 by a conductive object arranged between the first transparent substrate 121 and the second transparent substrate 127. Specifically, the second transparent electrode 126 is directly electrically connected with a part of the conductive layer located on the first transparent substrate 121 through a conductive object (such as conductive particles), and the part of the conductive layer is electrically connected with the second connecting finger area 14112 on the FPC board 14, and the second connecting finger area 14112 is electrically conductive to the second PAD area 14122 through the conductive layer (such as copper foil layer) of the FPC board 14 itself, that is, the PAD area is preferably a metal reserved pad. The connecting finger area and the PAD area are mutually positive and negative sides of the electrode connecting line, and they are electrically conductive. In this embodiment, the first PAD area 14121 and the second PAD area 14122 are electrically connected to the control unit as the connecting part that connects the control unit again. However, the invention is not limited to this. The electrode connection mode of the electrode connection line can also adopt metal pin connection, Zebra Paper connection and other connection modes.

In the present invention, the size of the first transparent substrate 121 is set larger than that of the second transparent substrate 127 as the auto-dimming rear view mirror is the frameless auto-dimming rear view mirror. All areas of the first transparent substrate 121 can be used as mirror. At the same time, in order to facilitate the hiding of connection line, the first transparent substrate 121 is provided with a step A1 which is beyond the position of the second transparent substrate 127 at its edge. The electrode connection line 14 is set in the step, which saves space and improves the service life and reliability of the electrode connection line as well. In order to prevent the visual presence of the electrode connection line from affecting the visual effect when the frameless auto-dimming rear view mirror of the invention is observed from the front, the outside surface of the absorptive-type polarizing layer is screen printed with ink to conceal the area where the electrode connection line is located and the frame glue area in the display module. In addition, the frameless auto-dimming rear view mirror is connected with electrodes from the side of the first transparent substrate 121 diverging from the absorptive-type polarizing layer (that is, the side diverging from the observer). So the electrode connection line can be concealed to achieve the effect that the whole of the first transparent substrate 121 can be used as a mirror surface when the observer observes the frameless auto-dimming rear view mirror from the outside. In addition, the outermost side of the frameless auto-dimming rear view mirror near the observer is an absorptive-type polarizer. Compared with the traditional rear view mirror which uses glass on the outermost side near the observer, the frameless auto-dimming rear view mirror of the invention will not have ghosting phenomenon and greatly improve the mirror finish effect. The frameless design and the screen printed ink layer increase the effective use area of the mirror surface, which has non ghosting and more excellent auto-dimming effect compared with the auto-dimming rear view mirror in the prior art.

In this embodiment, as shown in FIG. 3, preferably, the connection between the outer area 142 and the inner area 141 is provided with a cutting line 143, which is convenient for subsequent cutting and removal of the outer area 142, and the cutting line 143 is flush with the edge of the first transparent substrate 121 or located inside the edge of the first transparent substrate 121, so that the remaining part of the electrode connection line after cutting is concealed in the coverage range below the first transparent substrate 121, so that the edge part of the first transparent substrate 121 looks beautiful from the outside and convenient for subsequent assembly. In this embodiment, the outer area 142 is set to facilitate the machine grabbing of FPC board 14 during the production and manufacturing process and accurate alignment when FPC board 14 is bound. The outer area 142 in this embodiment does not contain connecting lines and is not used as connecting functional component. However, the invention is not limited to this. It's not necessary to set a specific cutting line 143 between the outer area 142 and the inner area 141, and the shape and structure of the outer area 142 are not limited to those shown in FIGS. 2 and 3, but can also be other shape structures, as long as it can meet the grabbing and positioning binding of FPC board 14, which is not described in details.

Figure 4:
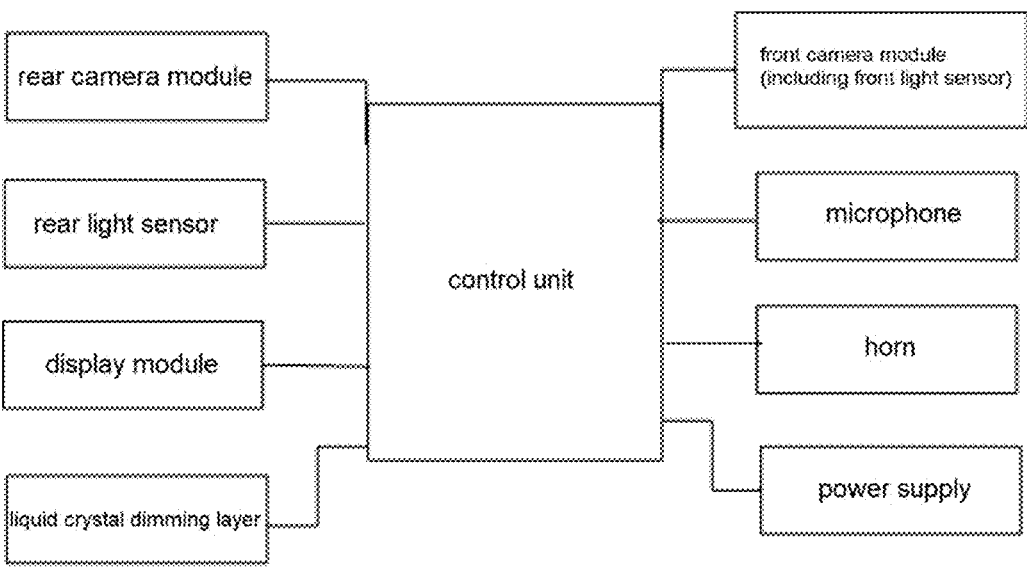
FIG. 4 is the schematic view of the control unit connecting various parts in the frameless auto-dimming rear view mirror of the specific embodiment of the invention.

FIG. 4 is the schematic view of the control unit connecting various parts in the frameless auto-dimming rear view mirror of the specific embodiment of the invention. As shown in FIG. 4, the frameless auto-dimming rear view mirror in this embodiment also comprises at least a light sensor 16 and a control unit 17, and the light sensor 16 detects changes in ambient light and feeds information back to the control unit 17, and the control unit 1π electronically adjusts the voltage applied to the liquid crystal layer according to the change information detected in ambient light. In this embodiment, preferably, the light sensor 16 comprises a front light sensor facing toward the front of the frameless auto-dimming rear view mirror and a rear light sensor facing toward the rear of the frameless auto-dimming rear view mirror, and the front and rear light sensors are operationally connected to the control unit 17. Specifically, the front light sensor always senses the change of ambient light intensity. When the ambient light intensity falls below a certain value (at night or entering a dark environment), the front light sensor sends a signal ① to the control unit 17. When the control unit 17 receives the signal ①, the rear light sensor begins to detect the light intensity from the rear of the vehicle, and if the rear light is detected to be stronger than a certain value (for example, the rear car turns on the high beam), the rear light sensor sends a signal ② to the control unit 17. After the control unit 17 receives the signal ②, the control unit sends the output voltage to the first transparent electrode 122 and the second transparent electrode 126 on both sides of the liquid crystal dimming layer 12. The control unit 17 applies different voltages to the liquid crystal molecules in the liquid crystal dimming layer 12 to adjust the arrangement structure of the liquid crystal molecules, so as to adjust the polarization direction of the light passing through the liquid crystal dimming layer, so that the mirror reflectivity of the frameless auto-dimming rear view mirror is reduced to achieve the dimming effect. When the strong light behind the vehicle disappears, the control unit 17 controls the mirror reflectivity of the frameless auto-dimming rear view mirror, and automatically returns to normal. In this embodiment, the front light sensor and the rear light sensor are patch or plug-in light sensors, for example.

As shown in FIG. 4, the frameless auto-dimming rear view mirror in this embodiment also comprises a front camera module 18, a front camera adapter cable, a rear camera module 19 and a rear camera adapter cable. The front camera module 18 is connected to the control unit 17 through the front camera adapter cable, and the rear camera module 19 is connected to the control unit 17 through the rear camera adapter cable. Further, the front camera module 18 comprises the front camera module, front camera front cover, front camera back cover, front camera bracket and front camera decoration. The front camera module 18 is operationally connected to the control unit 17 through the front camera adapter cable and the control unit 17 can give various commands to the front camera module, and the front camera module 18 executes the commands of shooting/transmitting the road conditions ahead. In this embodiment, the front camera module 18 is closely assembled with the shell of the frameless auto-dimming rear view mirror, forming an integrated design; in the other preferred solution, the front camera module 18 and the shell of the frameless auto-dimming rear view mirror are independent of each other, and the front camera module 18 is operationally secured to the front windshield or other position of the car. The rear camera module 19 comprises the rear lens module, rear camera front cover, rear camera back cover, rear camera bracket and front camera decoration. The rear camera module 19 is operationally connected to the control unit 17 through the rear camera adapter cable and the control unit 17 can give various commands to the rear camera module 19, and the rear camera module 19 executes the commands of shooting/transmitting the road conditions behind. As shown in FIG. 4, the control unit 17 is electrically connected with the rear camera module, rear light sensor, touch layer, display module, LCD dimming mirror, front camera module (including front light sensor), microphone head, horn and power supply respectively. The control unit 17 receives the information of each component and controls the working state of each component.

In this embodiment, the control unit 17 can apply the main control chips and system solutions of well-known domestic and foreign manufacturers such as MSTAR solution system, Ambarella solution system, Novatek solution system, Jieli solution system, EMIS solution system, Android solution system, etc, which is not described in details.

In this embodiment, preferably, the front camera module 18 comprises a light sensor 16. Preferably, the front camera module 18 is used both as a part of the front lens module and as a front light sensor. Specifically, the front camera module 18 contains built-in components such as an image sensor, a highly integrated image processor, an embedded power supply, and a high-quality aspherical lens. Preferably, the image sensor is also used as a front light sensor and no additional front light sensor is required in this preferred embodiment. Preferably, the image sensor is a CMOS image sensor or a CCD image sensor. In the other preferred embodiment, an additional light sensor is provided. For example, a front camera module 18 can be installed at a position of the shell of the frameless auto-dimming rear view mirror where the light can not be blocked. In this embodiment, the rear light sensor is also included. The rear light sensor is installed at the position of the shell of the frameless auto-dimming rear view mirror where the light can not be blocked. The light-sensitive surface of the rear light sensor faces towards the rear of the vehicle to detect the light intensity from the vehicle behind; in the other preferred embodiment, the rear camera module 19 comprises a rear light sensor 16 and the rear camera module 19 is used both as a part of the rear lens module and as a rear light sensor. In the preferred embodiment, no additional rear light sensor is required. Preferably, the image sensor is a CMOS image sensor or a CCD image sensor. In the frameless auto-dimming rear view mirror of this embodiment, it also includes a shell, which includes a front shell and a rear shell. Preferably, the shell has a convex structure design in the lower part of the shell and the convex is used to set the rear light sensor.

The frameless auto-dimming rear view mirror of this embodiment also includes a display module 20 located on the side of the reflective-type polarizing layer 13 diverging from the liquid crystal dimming layer 12. Further, the polarization direction of the polarized light emitted by the display module 20 is perpendicular to the polarization direction of the reflection axis of the reflective-type polarizing layer 13. Preferably, the display module 20 is a TFT LCD screen of 9.2"/9.35"/9.66"/9.88" or larger size. As shown in FIG. 4, in this embodiment, the display module 20 is operably connected to control unit 17, and the control unit 17 can control display module 20 to display different contents. For example, the control unit controls display module 20 to display road condition information in front or behind, so that the driver and passenger can observe the road condition information in front and behind in real time through the display module.

As shown in FIG. 4, preferably, the frameless auto-dimming rear view mirror also comprises a power supply for the control unit 17 and also comprises a horn and a microphone, which are respectively used for sending and receiving sound signals. Further, in this embodiment, the shell of the frameless auto-dimming rear view mirror is provided with a microphone hole and the microphone is installed inside the shell and connected with the control unit 17. When the driver sends voice commands, the microphone converts the received acoustical signals into electrical signals. After the control unit 17 receives the electrical signals from the microphone, the control unit 17 sends commands to the display module or other components of the rear view mirror after processing, to realize the functions of turning on/off the display module, adjusting the viewing angle, adjusting the brightness, turning on/off the video, playback and voice broadcast, etc. Further, the rear shell of the frameless auto-dimming rear view mirror is provided with a horn hole. The horn is installed inside the shell and connected with the control unit 17. When the control unit 17 sends commands to the horn, the horn can convert the electrical signals into acoustical signals to realize human-computer voice interaction, such as playing music, voice navigation, voice warning and other functions.

Figure 5:
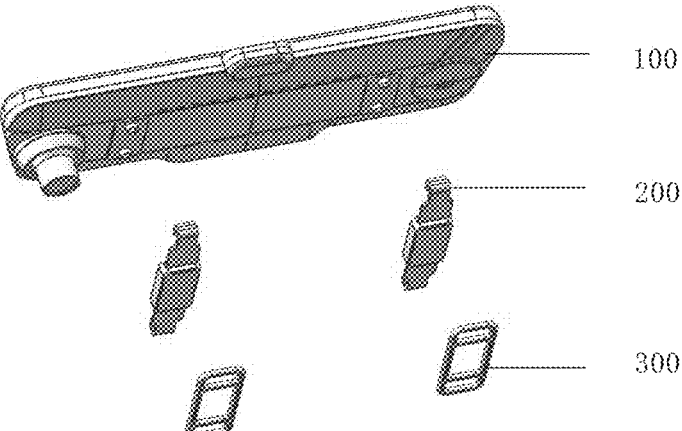
FIG. 5 is the schematic view of back hook and strap of the frameless auto-dimming rear view mirror of the specific embodiment of the invention.

FIG. 5 is the schematic view of back hook and strap of the frameless auto-dimming rear view mirror of the specific embodiment of the invention. As shown in FIG. 5, in this embodiment, the frameless auto-dimming rear view mirror also comprises a detachable back hook 200 and a strap 300 on the shell 100 opposite to the observer. For example, the outer surface of the shell 100 of the frameless auto-dimming rear view mirror is equipped with two groups of back hook positions on the left and right, each group has two upper and lower back hooks 200, and each is equipped with an elastic strap 300. When replacing the rear view mirror, hook one end of the strap on one of the back hooks, move round the original rear view mirror, stretch the strap to a proper degree of tightness, and hook the other end of the strap on the other back hook of the same group of back hooks. Make the same operation to the other group of back hooks. With the back hook and strap structure, the disassembly process of the original mirror can be omitted when the rear view mirror needs to be replaced.

Figure 6:
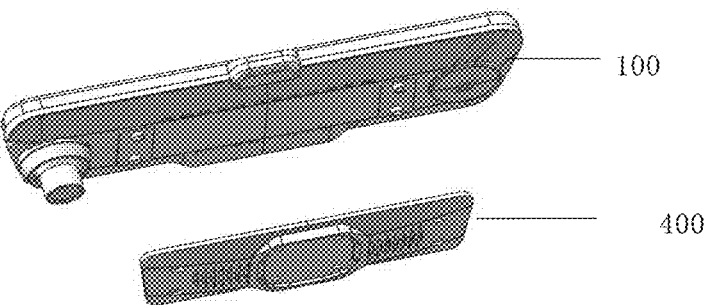
FIG. 6 is the schematic view of the special back plate of the frameless auto-dimming rear view mirror of the specific embodiment of the invention.

FIG. 6 is the schematic view of the special back plate of the frameless auto-dimming rear view mirror of the specific embodiment of the invention. As shown in FIG. 6, further, the outside surface of the shell 100 of the frameless auto-dimming rear view mirror in this embodiment can also be equipped with a detachable special back plate 400. When it is necessary to remove the original rear view mirror and install the frameless auto-dimming rear view mirror, first remove the back hook from the shell of the rear view mirror, and then install the special back plate 400 on the shell of the rear view mirror, and then fix the special bracket with screws in the special slot, and finally install the special bracket on the front windshield. In this embodiment, preferably, the special back plate is provided with a general special bracket slot, which can match the special brackets of most vehicle models in the market. In addition, in order to facilitate installation, it's also possible to remove the special back plate from the shell of the rear view mirror and install the back hook and strap on the shell of the rear view mirror. When replacing the rear view mirror, the disassembly process of the original mirror can be omitted.

In this embodiment, further, a dust-proof sponge can be arranged between the display module and the liquid crystal dimming layer. Preferably, the thickness of the dust-proof sponge is between 0.2 mm and 3.0 mm. Preferably, the dust-proof sponge has glue on one side, and the glue is pasted on the periphery outside the effective display area of the display screen of the display module to play a dust-proof and cushioning role. Further, the interior of the frameless auto-dimming rear view mirror is provided with insulating tape or shielding material, which is wrapped on the surface of the electrode connection line or the surface of the electronic components of the control unit to play the role of insulation, shielding magnetic field and anti-electromagnetic interference. Further, the shell of the frameless auto-dimming rear view mirror is equipped with a power cord jack, and the power cord is connected with the control unit through the power cord jack to provide power to the control unit. Preferably, the power cord jack size is the universal USB interface size or the universal circular power plug size. Preferably, the power cord is a 12V to 5V step-down cable. One end of the power cord is connected to the 12V power supply contact of the vehicle, and the other end provides 5V power to the control unit. Further, the shell of the frameless auto-dimming rear view mirror is equipped with a rear camera module adapter jack. One end of the rear camera module adapter cable is connected to the rear camera module, and the other end is connected to the control unit through the rear camera module adapter jack. Preferably, the size of the power cable jack is the general specification size of the USB interface or the general specification size of the round power plug. Further, the shell of the frameless auto-dimming rear view mirror is equipped with an SD card slot, and the SD card is installed in the SD card slot to store data recorded by the rear view mirror. Further, the shell of the frameless auto-dimming rear view mirror is equipped with a GPS module jack, and the frameless auto-dimming rear view mirror can realize the GPS function through the external GPS module. Further, the shell of the frameless auto-dimming rear view mirror is equipped with key holes and keys, and the driver can control the mirror through the keys. Further, the shell of the frameless auto-dimming rear view mirror is equipped with a cooling hole, and the heat generated by each unit in the frameless auto-dimming rear view mirror is dissipated through the cooling hole. Further, the shell of the frameless auto-dimming rear view mirror is equipped with jacks for other external modules, preferably including OBD modules, ADAS modules, etc. Further, the frameless auto-dimming rear view mirror also includes dust screen for microphone, dust screen for horn, dust screen for heat dissipation hole, etc. to reduce external pollutants entering the interior of the frameless auto-dimming rear view mirror. Further, the frameless auto-dimming rear view mirror also includes the connecting line between the display module and the control unit, the connecting line between the horn and the control unit, the connecting line between the microphone and the control unit, and the connecting line between the front camera module and the control unit.

Figure 7:
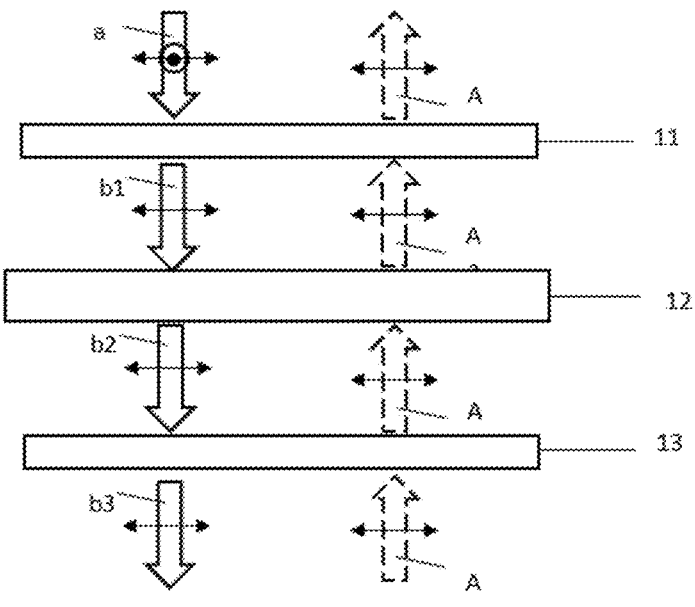
FIG. 7 is a schematic view of the light path when the frameless auto-dimming rear view mirror of the specific embodiment of the invention is in the working state of the streaming media display with the lowest reflectivity and the highest transmittance.

The working principle of the frameless auto-dimming rear view mirror of the invention is described below with reference to the Figures. FIG. 7 is a schematic view of the light path when the frameless auto-dimming rear view mirror of the specific embodiment of the invention is in the working state of the streaming media display with the lowest reflectivity and the highest transmittance. As shown in FIG. 7, when the display module is on, the control unit applies a voltage to the liquid crystal dimmer layer. In FIG. 7, a represents the external natural light, and a can be decomposed into mutually perpendicular polarized light b and c, where b represents the polarized light perpendicular to the absorption axis of absorptive-type polarizing layer 11, and c represents the polarized light parallel to the absorption axis of absorptive-type polarizing layer 11, and A represents the polarized display light emitted by the display module and A is perpendicular to the polarization direction of the reflection axis of the reflective-type polarizer, and B represents the polarized light parallel to the polarization direction of the reflection axis of the reflective-type polarizer. When the non-polarized ambient light a is incident to the absorptive-type polarizing layer 11, the light c parallel to the absorption axis of the absorptive-type polarizing layer 11 is absorbed, and the light b perpendicular to the absorption axis of the absorptive-type polarizing layer 11 can be transmitted and attenuate to b1, and when b1 is incident to the liquid crystal dimming layer 12, b1 can pass through the liquid crystal dimming layer 12 and attenuate to b2, and when b2 is incident to the reflective-type polarizing layer 13, b2 can pass through the reflective-type polarizing layer 13 and attenuate to b3. If each layer is an ideal dielectric material, the attenuation of light will tend to zero, and it can be seen that at this time, the reflectivity of the external light source reaches the lowest, and the reflectivity is within 10%. When the polarized light A emitted by the display module is incident on the reflective-type polarizing layer 13, A can pass through 13 and attenuate to A1. When A1 is incident on the liquid crystal dimming layer 12, A1 can pass through the liquid crystal dimming layer 12 and attenuate to A2; when A2 is incident on the absorptive-type polarizing layer 11, A2 can pass through the absorptive-type polarizing layer 11 and decay to A3. If each layer is an ideal dielectric material, the attenuation of light will tend to zero, and it can be seen that at this time, the polarized light emitted by the display module can almost pass through the liquid crystal dimming mirror, and the transmittance can reach 70%-90%. At this time, the frameless auto-dimming rear view mirror of the invention is in the streaming media display state with the lowest reflectivity and the highest transmittance of the display module.

Figure 8:
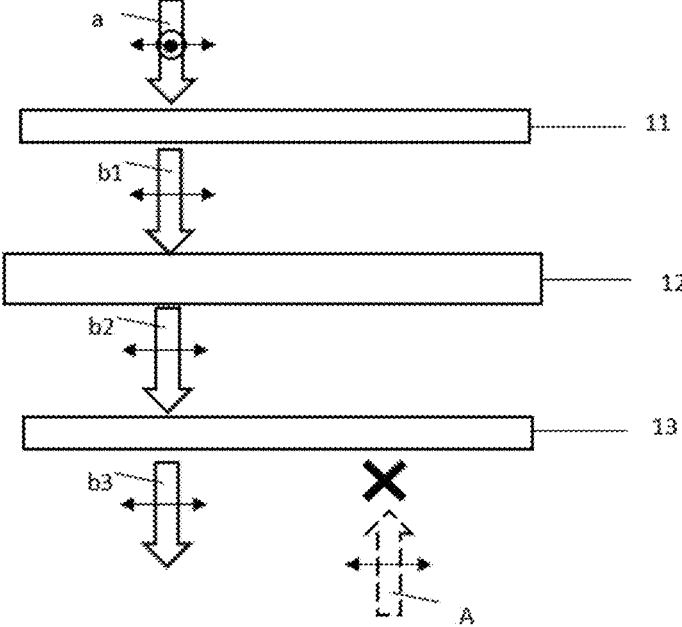
FIG. 8 is a schematic view of the light path when the frameless auto-dimming rear view mirror of the specific embodiment of the invention is in the dimming state.

FIG. 8 is a schematic view of the light path when the frameless auto-dimming rear view mirror of the specific embodiment of the invention is in the dimming state. As shown in FIG. 8, when the display module is turned off, the control unit determines whether to enter the dimming state according to the signals sent by the front light sensor and the rear light sensor. When it is determined that it is necessary to enter the dimming state, the control unit applies voltage to the liquid crystal dimming layer, and the mirror reflectivity is reduced to the lowest, with the reflectivity lower than 10%. The working principle is as follows: As shown in FIG. 8, a represents the external natural light, and a can be decomposed into mutually perpendicular polarized light b and c, where b represents the polarized light perpendicular to the absorption axis of absorptive-type polarizing layer 11, and c represents the polarized light parallel to the absorption axis of absorptive-type polarizing layer 11. Specifically, when the non-polarized ambient light a is incident to the absorptive-type polarizing layer 11, the light c parallel to the absorption axis of the absorptive-type polarizing layer 11 is absorbed, and the light b perpendicular to the absorption axis of the absorptive-type polarizing layer 11 can be transmitted and attenuate to b1, and when b1 is incident to the liquid crystal dimming layer 12, b1 can pass through the liquid crystal dimming layer 12 and attenuate to b2, and when b2 is incident to the reflective-type polarizing layer 13, b2 can pass through the reflective-type polarizing layer 13 and attenuate to b3. If each layer is an ideal dielectric material, the attenuation of light will tend to zero, and it can be seen that at this time, the reflectivity of the external light source reaches the lowest, and the reflectivity is within 10%. At this time, the frameless auto-dimming rear view mirror enters dimming state with the lowest reflection.

Figure 9:
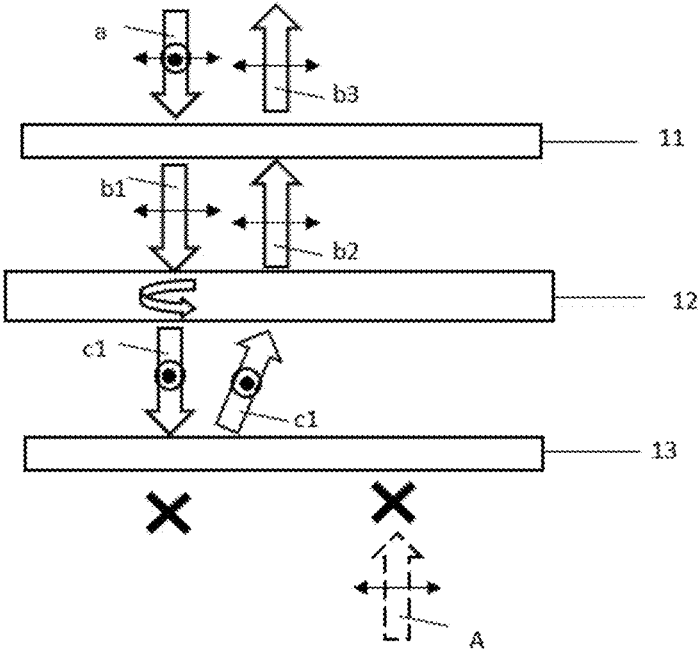
FIG. 9 is a schematic view of the light path when the frameless auto-dimming rear view mirror of the specific embodiment of the invention is in the mirror state with the highest reflectivity and the lowest transmittance.

FIG. 9 is a schematic view of the light path when the frameless auto-dimming rear view mirror of the specific embodiment of the invention is in the mirror state with the highest reflectivity and the lowest transmittance. As shown in FIG. 9, when the display module is turned off, the control unit determines whether to enter the dimming state according to the signals sent by the front light sensor and the rear light sensor. When it is determined that it is not necessary to enter the dimming state, the control unit doesn't apply voltage to the liquid crystal dimming layer, and the mirror reflectivity is remained in the highest state, with the reflectivity higher than 40%. The working principle is as follows: a represents the external natural light, and a can be decomposed into mutually perpendicular polarized light b and c, where b represents the polarized light perpendicular to the absorption axis of absorptive-type polarizing layer 11, and c represents the polarized light parallel to the absorption axis of absorptive-type polarizing layer 11. Specifically, when the non-polarized ambient light a is incident to the absorptive-type polarizing layer 11, the light c parallel to the absorption axis of the absorptive-type polarizing layer 11 is absorbed, and the light b perpendicular to the absorption axis of the absorptive-type polarizing layer 11 can be transmitted and attenuate to b1, and when b1 is incident to the liquid crystal dimming layer 12, the liquid crystal dimming layer 12 rotates b1 in the polarization direction by 90 degrees and then attenuate to c1, and when c1 is incident to the reflective-type polarizing layer 13, the reflection axis of reflective-type polarizing layer 13 is parallel to the polarization direction of c1 and c1 is reflected back to the liquid crystal dimming layer 12 by the reflective-type polarizing layer 13, and when c1 is incident to the liquid crystal dimming layer 12, the liquid crystal dimming layer 12 rotates c1 in the polarization direction by 90 degrees and then attenuate to b2, and when b2 is incident to the absorptive-type polarizing layer 11, b2 can pass through the absorptive-type polarizing layer 11 and attenuate to b3. If each layer is an ideal dielectric material, the attenuation of light will tend to zero, and it can be seen that at this time, the reflectivity of the external light source reaches the highest, and the reflectivity is higher than 40%. At this time, the rear view mirror is the mirror state with the highest reflection.

On the other hand, the invention also provides a production method of frameless auto-dimming rear view mirror, including the steps:

a. To provide a liquid crystal dimming layer, and the liquid crystal dimming layer comprises a first transparent substrate, a first transparent electrode, a first alignment layer, a liquid crystal layer, a second alignment layer, a second transparent electrode and a second transparent substrate arranged in sequence, and the first transparent substrate is adjacent to the absorptive-type polarizing layer, and the position of the first transparent substrate corresponds to the position of the second transparent substrate, and the first transparent substrate is provided with a step which is beyond the position of the second transparent substrate at its edge;

b. To form an electrode connecting line electrically connected with the first transparent electrode and the second transparent electrode respectively in the liquid crystal dimming layer and the binding device grabs the outer area of the electrode connecting line for alignment, and then hot press the inner area of the electrode connecting line so that the inner area of the electrode connecting line is located at the step and fixed on the side of the first transparent substrate facing the second transparent substrate. In the present invention, for example, the electrode connecting line is the FPC board, and the first transparent electrode is directly electrically connected with the electrode connecting line, and the second transparent electrode is electrically connected with the electrode connecting line through a conductive object (such as conductive particles) arranged between the first transparent substrate and the second transparent substrate;

c. Then to cut and remove the outer area of the electrode connecting line. Specifically, the special equipment grabs the positioning area of the electrode connecting line for alignment before binding. After alignment, the equipment pressure head applies certain pressure and temperature to the area to be fixed with the electrode connecting line, and completes the binding process after maintaining a certain time. In the invention, in order to meet the design requirements of no frame, the area used for positioning is cut out after the binding is completed;

d. To provide an absorptive-type polarizing layer, and form an ink layer on one side of the absorptive-type polarizing layer, and then attach the side of the absorptive-type polarizing layer diverging from the ink layer to the liquid crystal dimming layer, or first attach the absorptive-type polarizing layer to the liquid crystal dimming layer, and then form an ink layer on the side of the absorptive-type polarizing layer diverging from the liquid crystal dimming layer;

e. To attach the reflective-type polarizing layer to the other side of the liquid crystal dimming layer.

In the invention, the polarization direction of the absorption axis of the absorptive-type polarizing layer is parallel or perpendicular to that of the reflection axis of the reflective-type polarizer, and the parallelism or perpendicularity of the polarization direction of the absorption axis of the absorptive-type polarizing layer and the reflection axis of the reflective-type are determined according to the different liquid crystal materials selected for the liquid crystal dimming layer. For example, if TN liquid crystal material is selected for the liquid crystal dimming layer, the polarization direction of the absorption axis of the absorptive-type polarizing layer is parallel to that of the reflection axis of the reflective-type polarizer; if VA liquid crystal material is selected for the liquid crystal dimming layer, the polarization direction of the absorption axis of the absorptive-type polarizing layer is perpendicular to that of the reflection axis of the reflective-type polarizer, which is not described in details.

The frameless auto-dimming rear view mirror of the invention has no ghosting, fast dimming speed and high utilization efficiency of the mirror surface; and the production method of the frameless auto-dimming rear view mirror of the invention is simple and its production cost is low. The frameless auto-dimming rear view mirror of the invention adopts frameless design, which greatly increases the effective use area of the mirror surface, and has automatic dimming function. Compared with the electrochromic dimming rear view mirror, the dimming speed of the invention is fast within tens of milliseconds. In addition, compared with the traditional streaming media rear view mirror, the problem of ghosting is solved. The mirror of traditional streaming media rear view mirror is made of semi-transparent and semi-reflective glass and the reflectivity of the glass is greater than 40% and cannot be adjusted. When the rear traffic is observed through the display module, the existence of reflection will cause the reflection image and the display image to interfere with each other; the invention adopts liquid crystal dimming technology and when the rear traffic is observed through the display screen, the reflectivity of the mirror will automatically be reduced to less than 10%, greatly reducing the brightness of the reflection image, so as to solve the problem of ghosting. In addition, the frameless auto-dimming rear view mirror of the present invention has the advantage of high brightness. The light transmittance of the traditional streaming media rear view mirror is usually less than 60%, causing the problem of low display brightness. However, the light transmittance of the frameless auto-dimming rear view mirror of the present invention can be automatically adjusted to more than 70%, which improves the light source utilization of the display screen, thus improving the display brightness, reducing heat generation, reducing costs, and making it safer and more reliable. The frameless auto-dimming rear view mirror of the present invention adopts the special bracket for special vehicles or adopts the way of installing the back hook and strap, which facilitates the replacement and installation, and can be applicable to the installation of the special bracket for special vehicles of various vehicle models, and can also omit the disassembly process of the original mirror.

The technical principle of the invention is described above in combination with specific embodiments. These descriptions are intended only to explain the principles of the invention and shall not in any way be interpreted as limiting the scope of protection of the invention. Based on the interpretation herein, those skilled in the art may associate other specific embodiments of the invention without creative work, and these methods will fall within the scope of protection of the invention.

The invention claimed is:

1. A frameless auto-dimming rear view mirror, wherein: the frameless auto-dimming rear view mirror comprises an absorptive-type polarizing layer, a liquid crystal dimming layer and a reflective-type polarizing layer arranged in sequence from the side of the observer, and the liquid crystal dimming layer comprises a first transparent substrate, a first transparent electrode, a first alignment layer, a liquid crystal layer, a second alignment layer, a second transparent electrode and a second transparent substrate arranged in sequence, and the first transparent substrate is adjacent to the absorptive-type polarizing layer, and a position of the first transparent substrate corresponds to a position of the second transparent substrate, and the first transparent substrate is provided with a step which is beyond the position of the second transparent substrate at its edge, and the frameless auto-dimming rear view mirror also comprises an electrode connecting line electrically connected with the first transparent electrode and the second transparent electrode respectively, and the electrode connecting line is located at the step and fixed on the side of the first transparent substrate facing the second transparent substrate, wherein, the electrode connecting line is FPC board; and the FPC board comprises an inner area and an outer area connected to the inner area, and the inner area comprises a connecting finger area and a PAD area, and the connecting finger area comprises a first connecting finger area and a second connecting finger area, and the first connecting finger area is electrically connected to the first transparent electrode, and the second connecting finger area is electrically connected to the second transparent electrode, and the PAD area comprises a first PAD area and a second PAD area, and the first PAD area is electrically connected to the first connecting finger area, and the second PAD area is electrically connected to the second connecting finger area.

2. The frameless auto-dimming rear view mirror according to the claim 1, wherein: it also comprises an ink layer located on the side of the absorptive-type polarizing layer diverging from the first transparent substrate.

3. The frameless auto-dimming rear view mirror according to the claim 2, wherein: the ink in the ink layer is screen printing ink or metallic printing ink, and the width of the ink layer is in the range of 1.0 mm-10 mm.

4. The frameless auto-dimming rear view mirror according to the claim 1, wherein: a connection between the outer area and the inner area is provided with a cutting line, which is convenient for subsequent cutting and removal of the outer area, and the cutting line is flush with the edge of the first transparent substrate or located inside the edge of the first transparent substrate.

5. The frameless auto-dimming rear view mirror according to the claim 1, wherein: the frameless auto-dimming rear view mirror also comprises at least a light sensor and a control unit, and the light sensor detects changes in ambient light and feeds information back to the control unit, which electronically adjusts the voltage applied to the liquid crystal layer according to the information.

6. The frameless auto-dimming rear view mirror according to the claim 5, wherein: the light sensor comprises a front light sensor facing the front of the frameless auto-dimming rear view mirror and a rear light sensor facing the rear of the frameless auto-dimming rear view mirror.

7. The frameless auto-dimming rear view mirror according to the claim 5, wherein: the frameless auto-dimming rear view mirror also comprises a front camera module, a front camera adapter cable, a rear camera module and a rear camera adapter cable, and the front camera module is connected with the control unit through the front camera adapter cable, and the rear camera module is connected with the control unit through the rear camera adapter cable.

8. The frameless auto-dimming rear view mirror according to the claim 1, wherein: the frameless auto-dimming rear view mirror also comprises a display module located on the side of the reflective-type polarizing layer diverging from the liquid crystal dimming layer.

9. The frameless auto-dimming rear view mirror according to the claim 1, wherein the frameless auto-dimming rear view mirror comprises a back hook and a strap opposite to an observer.

10. The frameless auto-dimming rear view mirror according to the claim 1, wherein: the frameless auto-dimming rear view mirror also comprises a horn and a microphone, which are respectively used for sending and receiving sound signals.

11. A production method of producing the frameless auto-dimming rear view mirror of claim 1, the method comprising the steps of:

a. To provide the liquid crystal dimming layer, and the liquid crystal dimming layer comprises the first transparent substrate, the first transparent electrode, the first alignment layer, the liquid crystal layer, the second alignment layer, the second transparent electrode and the second transparent substrate arranged in sequence, and the first transparent substrate is adjacent to the absorptive-type polarizing layer, and the position of the first transparent substrate corresponds to the position of the second transparent substrate, and the first transparent substrate is provided with the step which is beyond the position of the second transparent substrate at its edge;

b. To form the electrode connecting line electrically connected with the first transparent electrode and the second transparent electrode respectively in the liquid crystal dimming layer and a binding device grabs the outer area of the electrode connecting line for alignment, and then hot press the inner area of the electrode connecting line so that the inner area of the electrode connecting line is located at the step and fixed on the side of the first transparent substrate facing the second transparent substrate;

c. To cut and remove the outer area of the electrode connecting line;

d. To provide the absorptive-type polarizing layer, and form an ink layer on one side of the absorptive-type polarizing layer, and then attach the side of the absorptive-type polarizing layer diverging from the ink layer to the liquid crystal dimming layer, or first attach the absorptive-type polarizing layer to the liquid crystal dimming layer, and then form an ink layer on the side of the absorptive-type polarizing layer diverging from the liquid crystal dimming layer;

e. To attach the reflective-type polarizing layer to the other side of the liquid crystal dimming layer.

12. The production method according to the claim 11, wherein: the polarization direction of the absorption axis of the absorptive-type polarizing layer is parallel to or perpendicular to that of the reflection axis of the reflective-type polarizer.

13. The production method according to the claim 11, wherein: a connection between the outer area and the inner area is provided with a cutting line, which is convenient for subsequent cutting and removal of the outer area, and the cutting line is flush with the edge of the first transparent substrate or located inside the edge of the first transparent substrate.

14. The production method according to the claim 11, wherein: in the step b, the first transparent electrode is electrically connected directly with the electrode connecting line, and the second transparent electrode is electrically connected with the electrode connecting line through a conductive object arranged between the first transparent substrate and the second transparent substrate.

15. The production method according to the claim 14, wherein the conductive object is conductive particles.

\* \* \* \* \*